(12) United States Patent
Ding et al.

(10) Patent No.: US 10,348,520 B2
(45) Date of Patent: Jul. 9, 2019

(54) METHOD AND GATEWAY FOR COMMUNICATION BETWEEN BROWSER AND TELECOMMUNICATION NETWORK

(71) Applicant: ZTE Corporation, Shenzhen (CN)

(72) Inventors: Yan Ding, Shenzhen (CN); Junjun Mei, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 179 days.

(21) Appl. No.: 15/129,898

(22) PCT Filed: Aug. 20, 2014

(86) PCT No.: PCT/CN2014/084856
§ 371 (c)(1),
(2) Date: Sep. 28, 2016

(87) PCT Pub. No.: WO2015/172454
PCT Pub. Date: Nov. 19, 2015

(65) Prior Publication Data
US 2017/0141934 A1    May 18, 2017

(30) Foreign Application Priority Data
May 13, 2014 (CN) .......................... 2014 1 0201804

(51) Int. Cl.
*H04L 12/66* (2006.01)
*H04L 29/06* (2006.01)
(Continued)

(52) U.S. Cl.
CPC ............ *H04L 12/66* (2013.01); *H04L 65/104* (2013.01); *H04L 65/1006* (2013.01);
(Continued)

(58) Field of Classification Search
None
See application file for complete search history.

(56) References Cited

U.S. PATENT DOCUMENTS 8,695,077 B1    4/2014  Gerhard
2003/0081785 A1*   5/2003  Boneh ................... H04L 9/0847
380/277
(Continued)

FOREIGN PATENT DOCUMENTS

| CN | 102045330 A | 5/2011 |
| CN | 103227788 A | 7/2013 |
| CN | 103297445 A | 9/2013 |

OTHER PUBLICATIONS

International Search Report for corresponding application PCT/CN2014/084856 filed Aug. 20, 2014; dated Feb. 17, 2015.
(Continued)

*Primary Examiner* — Joshua Joo
(74) *Attorney, Agent, or Firm* — Cantor Colburn LLP

(57) ABSTRACT

The embodiments of the disclosure provide a method and gateway for communication between a browser and a telecommunication network. The method is applied to the gateway, and includes that: a first link with the browser is established, and a second link with a NGN or IMS network is established; first data from the browser is received on the first link, the first data is converted to obtain second data when the first data is call related Session Initiation Protocol (SIP) signaling, and the second data is sent to the NGN or IMS network on the second link; and third data from the NGN or IMS network is received on the second link, and when the third data is call related SIP signaling, and fourth data obtained by converting the third data is transparently transmitted to the browser on the first link. Fusion of an Internet technology and a communication technology is implemented.

17 Claims, 6 Drawing Sheets

(51) Int. Cl.
*H04L 29/08* (2006.01)
*H04W 84/04* (2009.01)

(52) U.S. Cl.
CPC ...... *H04L 65/1016* (2013.01); *H04L 65/1069* (2013.01); *H04L 65/605* (2013.01); *H04L 65/608* (2013.01); *H04L 67/02* (2013.01); *H04W 84/042* (2013.01)

(56) References Cited

U.S. PATENT DOCUMENTS

| | | | | |
|---|---|---|---|---|
| 2014/0222963 | A1* | 8/2014 | Gangadharan | H04L 65/1016 709/219 |
| 2014/0379931 | A1* | 12/2014 | Gaviria | H04L 65/1016 709/227 |
| 2015/0029296 | A1* | 1/2015 | Ni | H04N 7/148 348/14.01 |
| 2015/0180825 | A1* | 6/2015 | Ren | H04L 61/2564 709/228 |
| 2015/0312280 | A1* | 10/2015 | Belling | H04M 7/0039 370/401 |
| 2016/0066221 | A1* | 3/2016 | Sapkota | H04W 36/36 455/436 |
| 2017/0289158 | A1* | 10/2017 | Shaw | H04L 63/0884 |

OTHER PUBLICATIONS

"3rd Generation Partnership Project; Technical Specification Group Services and System Aspects; Study Real Time Communication . . . ", Retrieved from the Internet URL: http://www.3gpp.org/ftp/Specs/2014-12/Rel-12/23_series/, pp. 16-36, Dec. 17, 2013, XP050906652.

European Search Report for corresponding application EP 14 89 1875; Report dated Apr. 28, 2017.

* cited by examiner

METHOD AND GATEWAY FOR COMMUNICATION BETWEEN BROWSER AND TELECOMMUNICATION NETWORK

TECHNICAL FIELD

The disclosure relates to a Web Real-Time Communication (Webrtc) technology, and in particular to a method and gateway for communication between a browser and a telecommunication network.

BACKGROUND

Webrtc is a technology for implementing real-time verbal, video and data communication between browsers. Before the technology emerges, browsers may implement real-time communication by virtue of a private technology, for example, by installing a plug-in, and for a user, it is a tedious process to download, install and update the plug-in; and for application development, it is troublesome to test and maintain the plug-in. After the Webrtc technology is open source, each browser manufacturer may embed the Webrtc technology to encapsulate various functions required by real-time communication, such as an audio and video engine and Network Address Translation (NAT) transversal, so that a Web application developer may simply implement the real-time communication between browsers by virtue of a Hyper-Text Markup Language (HTML) label and a JavaScript Application Program Interface (API). At present, browsers such as Chrome, Firefox and IE are embedded with the Webrtc technology.

The related art has the following problem: in a Next Generation Network (NGN) or Internet Protocol Multimedia Subsystem (IMS) network, terminals to which Session Initiation Protocol (SIP)-based implementation of verbal, video and data communication is oriented may only include conventional SIP software and hardware terminals, and may not implement the real-time communication with terminals supporting the Webrtc technology.

SUMMARY

The embodiments of the disclosure provide a method and gateway for communication between a browser and a telecommunication network, so as to at least overcome the shortcoming of incapability of the telecommunication network, particularly an NGN or IMS network, in real-time communication with a terminal browser supporting a Webrtc technology in the related art.

In order to solve the technical problem, one embodiment of the disclosure provides a method for communication between a browser and a telecommunication network, which may be applied to a gateway, the method including that: establishing a first link with the browser, and establishing a second link with a Next Generation Network (NGN) Internet Protocol Multimedia Subsystem (IMS) network; receiving first data from the browser on the first link, converting the first data to obtain second data when the first data is call related Session Initiation Protocol (SIP) signaling, and sending the second data to the NGN or IMS network on the second link; and receiving third data from the NGN or IMS network on the second link, converting the third data to obtain fourth data when the third data is call related SIP signaling, and transparently transmitting the fourth data to the browser on the first link.

In an example embodiment, establishing the first link with the browser includes: establishing a Websocket link between the gateway and the browser as the first link.

In an example embodiment, establishing the second link with the NGN or IMS network includes: establishing a User Datagram Protocol (UDP) or Transmission Control Protocol (TCP) or Transport Layer Security (TLS) link between the gateway and the NGN or IMS network as the second link.

In an example embodiment, receiving the first data from the browser on the first link further includes: when the first data is non-call related SIP signaling, directly transparently transmitting the first data to the NGN or IMS network.

In an example embodiment, sending the second data to the NGN or IMS network on the second link includes: generating a second instruction, which indicates to send the second data to the NGN or IMS network, according to a distribution rule after related information of the second data is analyzed.

In an example embodiment, directly transparently transmitting the first data to the NGN or IMS network includes: when the first data is non-call related SIP signaling, generating a third instruction, indicates to send the first data to the NGN or IMS network, according to a distribution rule after related information of the first data is analyzed.

In an example embodiment, converting the first data to obtain the second data when the first data is call related SIP signaling includes: modifying a Web Real-Time Communication (Webrtc) protocol related media parameter in a Session Description Protocol (SDP) packet of the first data into an NGN or IMS network related media parameter to obtain the second data.

In an example embodiment, modifying the Webrtc protocol related media parameter in the SDP packet of the first data into the NGN or IMS network related media parameter to obtain the second data includes: converting the first data based on a Datagram Transport Layer Security (DTLS) and Secure Real-time Transport Protocol (SRTP), an audio coding opus or g.711 protocol and a video coding VP8 or H.264 protocol into the second data, supported by the NGN or IMS network, based on a Real-time Transport Protocol (RTP), an audio coding g.711 protocol and a video coding H.263 or H.264 protocol.

In an example embodiment, converting the third data to obtain the fourth data when the third data is call related SIP signaling includes: modifying an NGN or IMS network related media parameter in the third data into a Webrtc protocol related media parameter to obtain the fourth data.

In an example embodiment, before converting the third data to obtain the fourth data, further including: generating a fourth instruction, which indicates to send the third data to a position where data conversion is performed, according to a distribution rule after related information of the third data is analyzed; and after converting the third data to obtain the fourth data, further including: generating a fifth instruction, which indicates to send the fourth data to the browser, according to the distribution rule after related information of the fourth data is analyzed.

In an example embodiment, receiving the third data from the NGN or IMS network on the second link further includes: when the third data is non-call related SIP signaling, directly determining the non-call related SIP signaling as the fourth data without conversion, and generating a sixth instruction, which indicates to direct transparently transmit the fourth data to the browser, according to a distribution rule after the related information of the fourth data is analyzed.

In an example embodiment, after receiving the first data from the browser on the first link, the method further includes: performing mask decryption on the first data.

In an example embodiment, before receiving the first data from the browser on the first link, the method further includes: acquiring a public network address and port for media reception of the browser, carrying the public network address and the port in the SDP packet, and carrying the SDP packet in the first data.

A device for communication between a browser and a telecommunication network may include: a link element, configured to establish a first link with the browser, and establish a second link with an NGN or IMS network; a first-direction conversion and sending element, configured to receive first data from the browser on the first link, convert the first data to obtain second data when the first data is call related Session Initiation Protocol (SIP) signaling, and send the second data to the NGN or IMS network on the second link; and a second-direction conversion and sending element, configured to receive third data from the NGN or IMS network on the second link, convert the third data to obtain fourth data when the third data is call related SIP signaling, and transparently transmit the fourth data to the browser on the first link.

In an example embodiment, the link element includes: a first link component, configured to establish a Websocket link between a gateway and the browser as the first link; and a second link component, configured to establish a User Datagram Protocol (UDP) or Transmission Control Protocol (TCP) or Transport Layer Security (TLS) link between the gateway and the NGN or IMS network as the second link.

A method for communication between a browser and a telecommunication network may be applied to a Websocket converter in a gateway, the Websocket converter may be connected with a SIP stack and the other end may be connected with a Webrtc browser supporting a Webrtc protocol, the method including that: a Websocket link between the Websocket converter and the Webrtc browser is established; a TCP or TLS link between the Websocket converter and the SIP stack is established, the Websocket link forming a corresponding relationship with the TCP or TLS link; the Websocket converter receives first data from the Webrtc browser on the Websocket link, and sends the first data to the SIP stack through the TCP or TLS link for the SIP stack to send the first data to a media server when the first data is call related SIP signaling and send second data to an NGN or IMS network after receiving the second data which is obtained by converting the first data by the media server and may be identified by the NGN or IMS network, and directly transparently transmit the first data to the NGN or IMS network when the first data is non-call related SIP signaling; and the Websocket converter transparently transmits fourth data to the Webrtc browser after receiving the fourth data which may be identified by the Webrtc browser from the SIP stack on the TCP or TLS link, wherein the fourth data may be obtained by converting call related SIP signaling from the NGN or IMS network as third data by the media server, or may be non-call related SIP signaling from the NGN or IMS network.

In an example embodiment, after the step that the Websocket link between the Websocket converter and the Webrtc browser is established, the method may further include that: the Websocket link is kept alive; and after the TCP or TLS link between the Websocket converter and the SIP stack is established, the method may further include that: the TCP or TLS link is kept alive.

In an example embodiment, the step that the first data is sent to the media server may specifically include that: the SIP stack sends related information of the first data to a distribution control unit in the gateway through an internal interface when the first data is call related SIP signaling, and the distribution control unit generates a first instruction according to a distribution rule after analyzing the related information, the first instruction arriving at the SIP stack through the internal interface and indicating the SIP stack to send the first data to the media server; and the step that the second data is sent to the NGN or IMS network may specifically include that: the SIP sends related information of the second data to the distribution control unit through the internal interface after receiving the second data which is obtained by converting the first data by the media server and may be identified by the NGN or IMS network, and the distribution control unit generates a second instruction according to the distribution rule after analyzing the related information, the second instruction arriving at the SIP stack through the internal interface and indicating the SIP stack to send the second data to the NGN or IMS network.

In an example embodiment, the step that the first data is directly transparently transmitted to the NGN or IMS network may specifically include that: the SIP stack sends the related information of the first data to the distribution control unit in the gateway through the internal interface when the first data is non-call related SIP signaling, and after analyzing the related information, the distribution control unit stores the related information and generates a third instruction according to the distribution rule, the third instruction arriving at the SIP stack through the internal interface and indicating the SIP stack to send the first data to the NGN or IMS network.

In an example embodiment, after the step that the SIP stack sends the first data to the media server when the first data is call related SIP signaling, the method may further include that: the media server modifies a Webrtc protocol related media parameter in an SDP packet of the first data into an NGN or IMS network related media parameter to obtain the second data.

In an example embodiment, the step that the media server modifies the Webrtc protocol related media parameter in the SDP packet of the first data into the NGN or IMS network related media parameter to obtain the second data may include that: the media server converts the first data based on a DTLS and SRTP, an audio coding opus or g.711 protocol and a video coding VP8 or H.264 protocol into the second data, supported by the NGN or IMS network, based on an RTP, an audio coding g.711 protocol and a video coding H.263 or H.264 protocol.

In an example embodiment, the operation that the fourth data is obtained by converting the call related SIP signaling from the NGN or IMS network as the third data by the media server may include that: the SIP stack is connected with the media server to send the third data to the media server; and the media server modifies an NGN or IMS network related media parameter in the third data into a Webrtc protocol related media parameter to obtain the fourth data.

In an example embodiment, before the operation that the fourth data is obtained by converting the call related SIP signaling from the NGN or IMS network as the third data by the media server, the method may further include that: the SIP stack sends related information of the third data to the distribution control unit in the gateway through the internal interface when the third data is call related SIP signaling, and the distribution control unit generates a fourth instruction according to the distribution rule after analyzing the related information, the fourth instruction arriving at the SIP stack through the internal interface and indicating the SIP stack to send the third data to the media server; after the operation that the fourth data is obtained by converting the call related SIP signaling from the NGN or IMS network as the third data by the media server, the method may further include that: the SIP stack sends related information of the fourth data to the distribution control unit through the internal interface after receiving the fourth data which is obtained by converting the third data by the media server and may be identified by the NGN or IMS network, and the distribution control unit generates a fifth instruction according to the distribution rule after analyzing the related information, the fifth instruction arriving at the SIP stack through the internal interface and indicating the SIP stack to send the fourth data to the Webrtc browser; and the step that the fourth data is transparently transmitted to the Webrtc browser may include that: the SIP stack sends the related information of the fourth data to the distribution control unit in the gateway through the internal interface when the non-call related SIP signaling is determined as the fourth data, and the distribution control unit generates a sixth instruction according to the distribution rule after analyzing the related information, the sixth instruction arriving at the SIP stack through the internal interface and indicating the SIP stack to directly transparently transmit the fourth data to the Webrtc browser.

In an example embodiment, after the step that the Websocket converter receives the first data from the Webrtc browser on the Websocket link, the method may further include that: mask decryption is performed on the first data.

In an example embodiment, before the step that the Websocket converter receives the first data from the Webrtc browser on the Websocket link, the method may further include that: the Webrtc browser interacts with an Interactive Connectivity Establishment (ICE) server in the gateway to acquire a public network address and port for media reception of the Webrtc browser, contains the public network address and the port in the SDP packet, and contains the SDP packet in the first data.

A gateway for communication between a browser and a telecommunication network, including: a Websocket converter and a Session Initiation Protocol (SIP) stack, wherein one end of the Websocket converter is connected with the SIP stack and the other end of the Websocket converter is connected with a Web Real-Time Communication (Webrtc) browser supporting a Webrtc protocol, wherein the Websocket converter is configured to establish a Websocket link with the Webrtc browser, establish a Transmission Control Protocol (TCP) or Transport Layer Security (TLS) link with the SIP stack, wherein the Websocket link has a corresponding relationship with the TCP or TLS link; and send first data to the SIP stack through the TCP or TLS link when receiving the first data from the Webrtc browser on the Websocket link; the SIP stack is configured to send the first data to a media server when the first data is call related SIP signaling and send second data to a Next Generation Network (NGN) or Internet Protocol Multimedia Subsystem (IMS) network after receiving the second data which is obtained by converting the first data by the media server and may be identified by the NGN or IMS network, and directly transparently transmit the first data to the NGN or IMS network when the first data is non-call related SIP signaling; the SIP stack is further configured to receive call related SIP signaling from the NGN or IMS network as third data, send the third data to the media server, and send fourth data to the Websocket converter after receiving the fourth data which is obtained by converting the third data by the media server and may be identified by the Webrtc browser, or receive non-call related SIP signaling from the NGN or IMS network and send the non-call related SIP signaling to the Websocket converter as the fourth data; and the Websocket converter is further configured to receive the fourth data from the SIP stack on the TCP or TLS link, and bear the fourth data on the corresponding Websocket link for sending the fourth data to the Webrtc browser.

In an example embodiment, the gateway is connected with the media server, wherein the media server is configured to modify a Webrtc protocol related media parameter in a Session Description Protocol (SDP) packet of the first data into an NGN or IMS network related media parameter to obtain the second data when the first data is call related SIP signaling, and modify an NGN or IMS network related media parameter in the third data into a Webrtc protocol related media parameter to obtain the fourth data when the third data is call related SIP signaling.

In an example embodiment, further including: a distribution control element, configured to receive related information sent from the SIP stack through an internal interface; in a process of processing the first data, when the related information indicates that: the first data is call related SIP signaling, generate a first instruction, which arrives at the SIP stack through the internal interface and indicates the SIP stack to send the first data to the media server, according to a distribution rule; and generate a second instruction, which arrives at the SIP stack through the internal interface and indicates the SIP stack to send the second data to the NGN or IMS network, according to the distribution rule; when the first data is non-call related SIP signaling, store the related information and generate a third instruction, which arrives at the SIP stack through the internal interface and indicates the SIP stack to send the first data to the NGN or IMS network, according to the distribution rule; in a process of processing the third data, when the related information indicates that: the third data is call related SIP signaling, generate a fourth instruction, which arrives at the SIP stack through the internal interface and indicates the SIP stack to send the third data to the media server, according to the distribution rule; and generate a fifth instruction, which arrives at the SIP stack through the internal interface and indicates the SIP stack to send the fourth data to the Webrtc browser, according to the distribution rule; and when the non-call related SIP signaling is determined as the fourth data, generate a sixth instruction, which arrives at the SIP stack through the internal interface and indicates the SIP stack to transparently transmit the fourth data to the Webrtc browser, according to the distribution rule.

In an example embodiment, a first functional integrated element includes a Websocket converter and an Interactive Connectivity Establishment (ICE) server, and a second functional integrated element includes a SIP stack, a distribution control element and a media server; and the first functional integrated element is connected with the second functional integrated element.

In an example embodiment, a first functional integrated element includes a Websocket converter and an ICE server, and a second functional integrated element includes a SIP stack, a distribution control element and a media server; and the first functional integrated element is connected with multiple second functional integrated elements.

In an example embodiment, a first functional integrated element includes a Websocket converter and an ICE server, and a second functional integrated element includes a SIP stack, a distribution control element and a media server; and the first functional integrated element is connected with multiple Websocket converters, and then the multiple Websocket converters are connected with the second functional integrated element.

In an example embodiment, a first functional integrated element includes a Websocket converter and an ICE server, and a second functional integrated element includes a SIP stack, a distribution control element and a media server; and the first functional integrated element is connected with multiple Websocket converters, and then each of the multiple Websocket converters is connected with one or more second functional integrated elements.

A system for Webrtc may include a gateway, a browser, configured to establish, maintain and delete a Websocket link with the gateway and generate first data; and a Next Generation Network (NGN) or Internet Protocol Multimedia Subsystem (IMS) terminal, connected with an NGN or IMS network and configured to generate third data.

The technical solutions of the disclosure have beneficial effects as follows: between the Webrtc browser and the SIP stack, the Websocket link is established with the Webrtc browser and the TCP or TLS link is established with the SIP stack, so that real-time communication may be established between a Webrtc-technology-based browser and a SIP-based NGN or IMS network, fusion of an Internet technology and a communication technology is implemented, development of users of a telecommunication operator and creation of a novel profit pattern are implemented for the telecommunication operator, and an Internet user may enjoy services provided in the field of telecommunication.

DETAILED DESCRIPTION

In order to make the technical problem to be solved, technical solutions and advantages of the disclosure clearer, detailed descriptions will be made below with reference to the drawings and specific embodiments.

Figure 1:
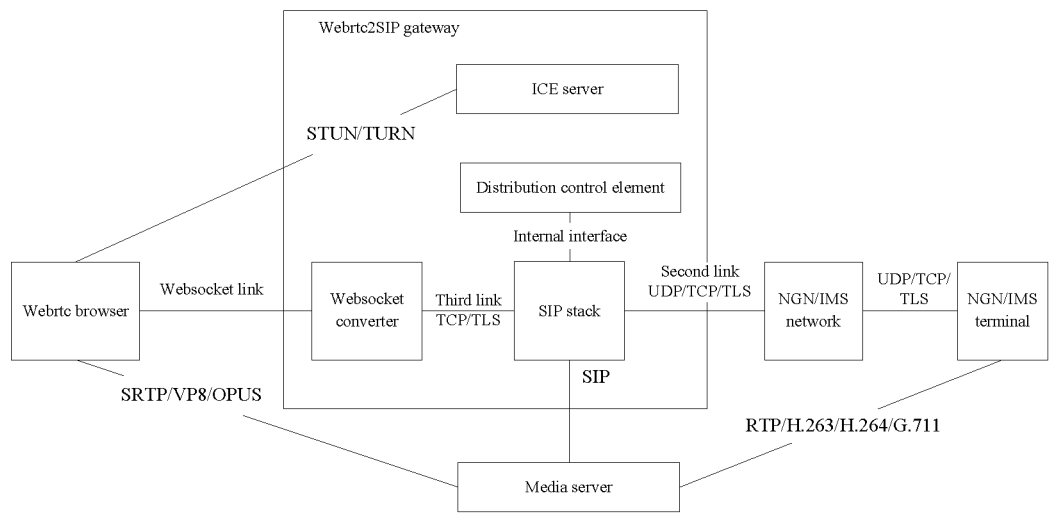
FIG. 1 is a structural schematic diagram of implementation of real-time communication between a Webrtc browser and an NGN or IMS network according to an embodiment of the disclosure.

As shown in FIG. 1, in a structure for implementing real-time communication between a Webrtc browser and a telecommunication network, the Webrtc browser is embedded with real-time audio, video and data communication and NAT traversal functions, is located at one end of a Webrtc2SIP gateway as Websocket User Equipment (UE), and may establish, maintain and delete a Websocket link and generate call related SIP signaling and non-call related SIP signaling required by real-time communication, and both the call related SIP signaling and the non-call related SIP signaling are signaling layer data.

The Webrtc2SIP gateway implements transmission with the Webrtc browser by virtue of the Websocket link, and implements transmission with the telecommunication network by virtue of a UDP or TCP or TLS. For the Webrtc browser (the Websocket UE), the Webrtc2SIP gateway is a Webrtc server, and for the telecommunication network, the Webrtc2SIP gateway is a proxy of a related SIP software or hardware terminal, and transmission between the telecommunication network and the related SIP software or hardware terminal is implemented on the basis of a UDP or TCP or TLS.

Figure 2:
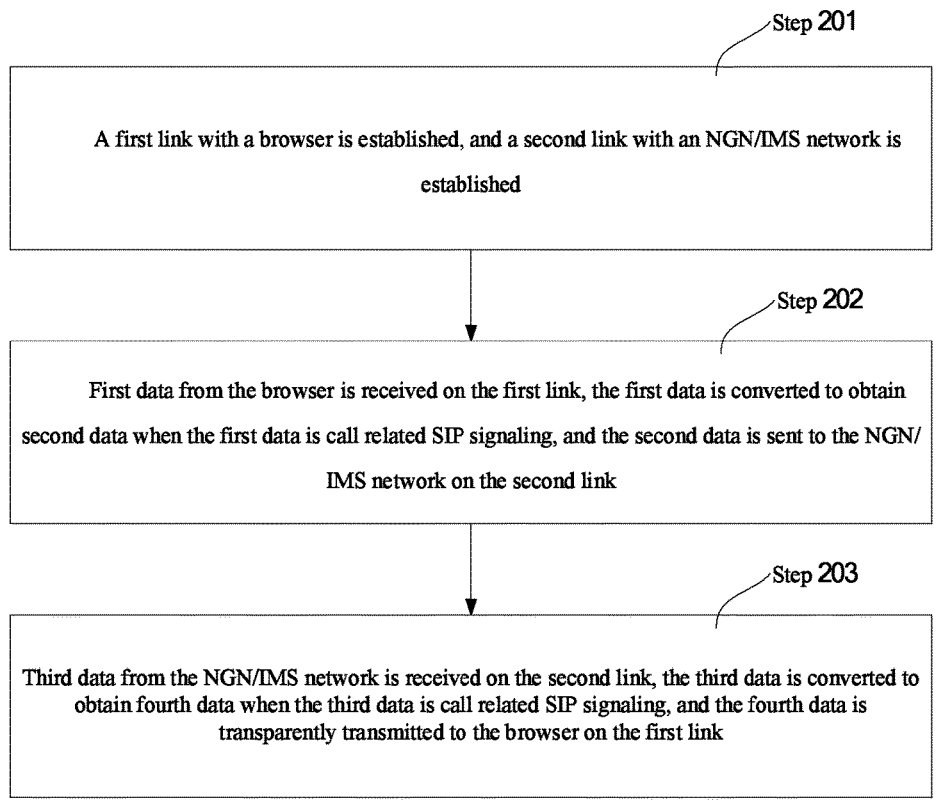
FIG. 2 is a schematic flowchart of a method for communication between a browser and a telecommunication network.

One embodiment of the disclosure provides a method for communication between a browser and a telecommunication network, which is applied to a gateway, and as shown in FIG. 2, the method includes:

Step 201: a first link with the browser is established, and a second link with an NGN or IMS network is established;

Step 202: first data from the browser is received on the first link, the first data is converted to obtain second data when the first data is call related SIP signaling, and the second data is sent to the NGN or IMS network on the second link; and Step 203: third data from the NGN or IMS network is received on the second link, the third data is converted to obtain fourth data when the third data is call related SIP signaling, and the fourth data is transparently transmitted to the browser on the first link.

By the above-mentioned technical solution, the real-time communication may be established between a Webrtc-technology-based browser and a SIP-based NGN or IMS network, fusion of an Internet technology and a communication technology is implemented, development of users of a telecommunication operator and creation of a novel profit pattern are implemented for the telecommunication operator, and an Internet user may enjoy services provided in the field of telecommunication.

The telecommunication network is specifically the NGN or IMS network. The browser is specifically a Webrtc browser.

In an example embodiment, the step that the first link with the browser is established includes that: a Websocket link between the gateway and the browser is established as the first link.

In an example embodiment, the step that the second link with the NGN or IMS network is established includes that: a UDP or TCP or TLS link between the gateway and the NGN or IMS network is established as the second link.

And, a TCP or TLS link is established between a Websocket converter and a SIP stack in the gateway as a third link.

In an example embodiment, the step that the first data is received from the browser on the first link further includes that: when the first data is non-call related SIP signaling, the first data is directly transparently transmitted to the NGN or IMS network.

In an example embodiment, the step that the second data is sent to the NGN or IMS network on the second link specifically includes that: a second instruction, which indicates to send the second data to the NGN or IMS network, is generated according to a distribution rule after related information of the second data is analyzed.

In an example embodiment, the step that the first data is directly transparently transmitted to the NGN or IMS network specifically includes that:

when the first data is non-call related SIP signaling, a third instruction is generated, which indicates to send the first data to the NGN or IMS network according to the distribution rule after related information of the first data is analyzed.

In an example embodiment, the step that the first data is converted to obtain the second data when the first data is call related SIP signaling includes that:

a Webrtc protocol related media parameter in an SDP packet of the first data is modified into an NGN or IMS network related media parameter to obtain the second data.

In an example embodiment, the step that the Webrtc protocol related media parameter in the SDP packet of the first data is modified into the NGN or IMS network related media parameter to obtain the second data includes that:

the first data based on a DTLS and SRTP, an audio coding opus or g.711 protocol and a video coding VP8 or H.264 protocol is converted into the second data, supported by the NGN or IMS network, based on an RTP, an audio coding g.711 protocol and a video coding H.263 or H.264 protocol.

In an example embodiment, the step that the third data is converted to obtain the fourth data when the third data is call related SIP signaling includes that:

an NGN or IMS network related media parameter in the third data is modified into a Webrtc protocol related media parameter to obtain the fourth data.

In an example embodiment, before the step that the third data is converted to obtain the fourth data, the method further includes that:

a fourth instruction, which indicates to send the third data to a position where data conversion is performed, is generated according to the distribution rule after related information of the third data is analyzed; and after the step that the third data is converted to obtain the fourth data, the method further includes that:

a fifth instruction, which indicates to send the fourth data to the browser is generated according to the distribution rule after related information of the fourth data is analyzed.

In an example embodiment, the step that the third data from the NGN or IMS network is received on the second link further includes that: when the third data is non-call related SIP signaling, the non-call related SIP signaling is directly determined as the fourth data without conversion, and a sixth instruction, which indicates to direct transparently transmit the fourth data to the browser, is generated according to the distribution rule after the related information of the fourth data is analyzed.

In an example embodiment, after the step that the first data from the browser is received on the first link, the method further includes that: mask decryption is performed on the first data.

In an example embodiment, before the step that the first data from the browser is received on the first link, the method further includes that:

a public network address and port for media reception of the browser are acquired, the public network address and the port are carried in the SDP packet, and the SDP packet is carried in the first data.

The telecommunication network is specifically the NGN or IMS network. The browser is specifically the Webrtc browser.

As shown in FIG. 1, the structure for implementing real-time communication between the Webrtc browser and the NGN or IMS network includes: the Webrtc browser, the Websocket converter, the SIP stack, a distribution control element, a media server, an ICE server, the NGN or IMS network and the like. In FIG. 1, direct interaction between the Webrtc browser and the media server and direct interaction between the media server and the related SIP software or hardware terminal refer to interaction about bottom-layer media data, and are implemented among the Webrtc browser, the media server and the SIP software or hardware terminal, or Media Gateway (MGW).

The Webrtc2SIP gateway includes: the Websocket converter, the SIP stack, the distribution control element, the media server and the ICE server, and is located between the Webrtc browser and the NGN or IMS network.

Based on technologies provided by each embodiment, the disclosure provides the method for communication between a browser and an NGN or IMS network, which is applied to a Webrtc2SIP gateway, the Webrtc2SIP gateway includes a Websocket converter, a SIP stack and a media server, the Websocket converter is connected with the SIP stack and the other end is connected with a Webrtc browser supporting a Webrtc protocol the method includes:

Step 1: a Websocket link between the Websocket converter and the Webrtc browser is established;

a TCP or TLS link between the Websocket converter and the SIP stack is established, wherein the Websocket link has a corresponding relationship with the TCP or TLS link;

Step 2: the Websocket converter receives first data from the Webrtc browser on the Websocket link, and sends the first data to the SIP stack through the TCP or TLS link for the SIP stack to send the first data to a media server when the first data is call related SIP signaling and send second data to an NGN or IMS network after receiving the second data which is obtained by converting the first data by the media server and may be identified by the NGN or IMS network, and directly transparently transmit the first data to the NGN or IMS network when the first data is non-call related SIP signaling; and Step 3: the Websocket converter transparently transmits fourth data to the Webrtc browser after receiving the fourth data which may be identified by the Webrtc browser from the SIP stack on the TCP or TLS link, wherein the fourth data is obtained by converting call related SIP signaling from the NGN or IMS network as third data by the media server, or is non-call related SIP signaling from the NGN or IMS network.

By the provided technology, between the Webrtc browser and the SIP stack, the Websocket link is established with the Webrtc browser and the TCP or TLS link is established with the SIP stack, so that real-time communication may be established between a Webrtc-technology-based browser and a SIP-based NGN or IMS network, fusion of an Internet technology and a communication technology is implemented, development of users of a telecommunication operator is implemented for the telecommunication operator, and an Internet user may enjoy services provided in the field of telecommunication.

In the Webrtc2SIP gateway, the Websocket converter is located between the Webrtc browser and the SIP stack, establishes the Websocket link with the Webrtc browser as a Websocket server, and establishes the TCP or TLS link with the SIP stack as TCP or TLS UE.

In a flow of communication between the Webrtc browser and the NGN or IMS network, in an example embodiment, after the step that the Websocket link between the Websocket converter and the Webrtc browser is established, the method further includes that: the Websocket link is kept alive; and after the TCP or TLS link between the Websocket converter and the SIP stack is established, the method further includes that: the TCP or TLS link is kept alive. The Websocket converter maintains the Websocket link with the Webrtc browser, including: link keeping-alive and link deletion, maintains the TCP or TLS link with the SIP stack, including: link keeping-alive and link deletion, and actively disconnects the link with the other end when the link with any end is disconnected.

Signaling layer SIP signaling is born on the Websocket link and the TCP or TLS link. In the embodiment of the disclosure, call related SIP signaling such as INVITE conversation related signaling is forwarded to the media server for processing; and non-call related SIP signaling such as Register, Message, Publish and NOTIFY is directly forwarded to a core network of the NGN or IMS network.

In an example embodiment, the first data is a Register message of requesting for registration from the Webrtc browser, the third data is a 200 Register message received from the NGN or IMS network by the SIP stack after successful registration, and both the Register message and the 200 Register message are non-call related SIP signaling; or, the first data is call regulated SIP signaling from the Webrtc browser, and the third data is call related SIP signaling received from the NGN or IMS network by the SIP stack.

According to a Websocket protocol, the first data sent from the Webrtc browser to the Websocket server is encrypted by mask operation, and the second data sent from the Websocket server to the Webrtc browser is not needed to be encrypted by mask operation. Therefore, in an example embodiment, after the step that the Websocket converter receives the first data from the Webrtc browser on the Websocket link, the method further includes that: mask decryption is performed on the first data.

One end of the SIP stack is connected with the Websocket converter, while the other end of the SIP stack is connected with the NGN or IMS network, thereby implementing sending and reception of SIP signaling, and the Websocket converter is required to perform mask decryption and then transparently transmit the SIP signaling to the SIP stack when receiving the SIP signaling sent by the Webrtc browser, and directly transparently transmits the SIP signaling to the Webrtc browser when receiving the SIP signaling sent by the SIP stack.

In an example embodiment, transmission between the SIP stack and the Websocket converter is implemented on a basis of the TCP or TLS link, and transmission between the SIP stack and the NGN or IMS network is implemented on a basis of a UDP or TCP or TLS link; and a distribution control indication is received through an internal interface, and SIP signaling is forwarded according to the distribution control indication.

And, the SIP stack is connected with the media server, and the media server implements media plane conversion.

The SIP stack reports a message to the distribution control element through the internal interface after receiving the message, and the distribution control element performs logical analysis to decide a forwarding target of the message. For example, for a call related SIP message such as INVITE, a call control component may indicate the SIP stack to send the message to the media server, then the media server processes and sends the message to the SIP stack, the SIP stack gives a report to the call control component, and the call control component indicates the SIP stack to send the message to the core network; while for a non-call related SIP message such as Register, the call control component may indicate the SIP stack to directly send the message to the core network without processing of the media server.

In an example embodiment, the step that the first data is sent to the media server specifically includes that:

the SIP stack sends related information of the first data to the distribution control element in the gateway through the internal interface when the first data is call related SIP signaling, and the distribution control element generates a first instruction, which arrives at the SIP stack through the internal interface and indicates the SIP stack to send the first data to the media server, according to a distribution rule after analyzing the related information; and the step that the second data is sent to the NGN or IMS network specifically includes that:

the SIP sends related information of the second data to the distribution control element through the internal interface after receiving the second data which is obtained by converting the first data by the media server and may be identified by the NGN or IMS network, and the distribution control element generates a second instruction, which arrives at the SIP stack through the internal interface and indicates the SIP stack to send the second data to the NGN or IMS network according to the distribution rule after analyzing the related information.

In an example embodiment, the step that the first data is directly transparently transmitted to the NGN or IMS network specifically includes that:

the SIP stack sends the related information of the first data to the distribution control element in the gateway through the internal interface when the first data is non-call related SIP signaling, and after analyzing the related information, the distribution control element stores the related information and generates a third instruction, which arrives at the SIP stack through the internal interface and indicates the SIP stack to send the first data to the NGN or IMS network, according to the distribution rule.

In an example embodiment, after the step that the SIP stack sends the first data to the media server when the first data is call related SIP signaling, the method further includes that:

the media server modifies a Webrtc protocol related media parameter in the first data into an NGN or IMS network related media parameter to obtain the second data.

In an example embodiment, the step that the media server modifies the Webrtc protocol related media parameter in the first data into the NGN or IMS network related media parameter to obtain the second data includes that:

the media server converts the first data based on a DTLS and SRTP, an audio coding opus or g.711 protocol and a video coding VP8 or H.264 protocol into the second data, supported by the NGN or IMS network, based on an RTP, an audio coding g.711 protocol and a video coding H.263 or H.264 protocol.

In an example embodiment, the operation that the fourth data is obtained by converting the call related SIP signaling from the NGN or IMS network as the third data by the media server includes that:

the SIP stack is connected with the media server to send the third data to the media server; and the media server modifies an NGN or IMS network related media parameter in the third data into a Webrtc protocol related media parameter to obtain the fourth data.

In an example embodiment, before the operation that the fourth data is obtained by converting the call related SIP signaling from the NGN or IMS network as the third data by the media server, the method further includes that:

the SIP stack sends related information of the third data to the distribution control element in the gateway through the internal interface when the third data is call related SIP signaling, and the distribution control element generates a fourth instruction, which arrives at the SIP stack through the internal interface and indicates the SIP stack to send the third data to the media server, according to the distribution rule after analyzing the related information;

after the operation that the fourth data is obtained by converting the call related SIP signaling from the NGN or IMS network as the third data by the media server, the method further includes that:

the SIP stack sends related information of the fourth data to the distribution control element through the internal interface after receiving the fourth data which is obtained by converting the third data by the media server and may be identified by the NGN or IMS network, and the distribution control element generates a fifth instruction, which arrives at the SIP stack through the internal interface and indicating the SIP stack to send the fourth data to the Webrtc browser, according to the distribution rule after analyzing the related information; and the step that the fourth data is transparently transmitted to the Webrtc browser includes that:

the SIP stack sends the related information of the fourth data to the distribution control element in the gateway through the internal interface when the non-call related SIP signaling is determined as the fourth data, and the distribution control element generates a sixth instruction, which arrives at the SIP stack through the internal interface and indicates the SIP stack to directly transparently transmit the fourth data to the Webrtc browser, according to the distribution rule after analyzing the related information.

Figure 3:
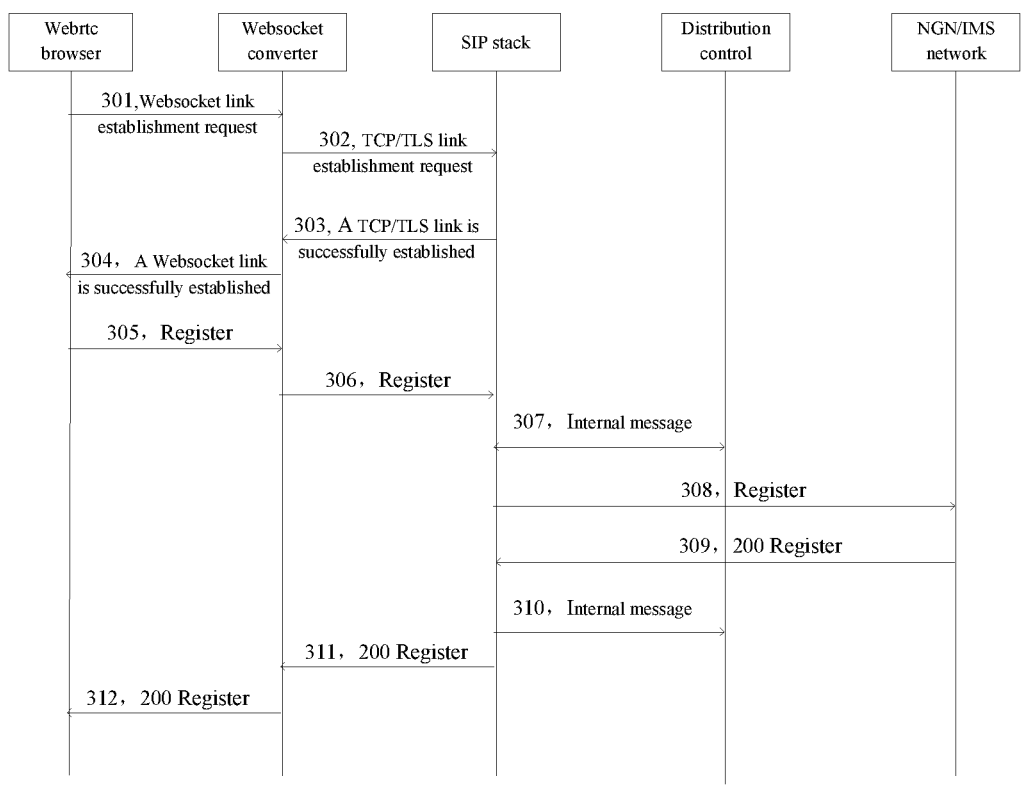
FIG. 3 is a schematic flowchart of registration of a Webrtc browser in an NGN or IMS network.

It is important to be noted that the Websocket converter extracts a payload part in a data frame according to the Websocket protocol and performs mask decryption operation on payload data at first when receiving data sent by the Webrtc browser on the Websocket link, and then sends the decrypted payload data to the SIP stack through the TCP or TLS link; and when receiving data sent by the SIP stack on the TCP or TLS link, the Websocket converter codes the data as a payload according to the Websocket protocol, and then sends a coded Websocket data frame to the Webrtc browser. In an application scenario, as shown in FIG. 3, registration of the Webrtc browser in the NGN or IMS network includes the following steps.

Step 301: the Webrtc browser sends a Websocket link establishment request to the Websocket converter.

Step 302: the Websocket converter sends a TCP or TLS link establishment request to the SIP stack in the Webrtc2SIP gateway after receiving the Websocket link establishment request.

Step 303: the SIP stack receives the TCP or TLS link establishment request, and successfully establishes a TCP or TSL link with the Websocket converter.

Step 304: the Websocket converter receives the Websocket link establishment request from the Webrtc browser, and replies with a success response after a Websocket link is successfully established.

At this moment, a corresponding relationship between the Websocket link and the TCP or TLS link is established in the Websocket converter, and due to existence of the corresponding relationship, the Websocket converter knows the corresponding TCP or TLS link for forwarding, thereby forwarding the data to the SIP stack when receiving the data from the Websocket link, and knows the corresponding Websocket link for forwarding, thereby forwarding the data to the corresponding Webrtc browser when receiving the data from the TCP or TLS link.

The Websocket converter maintains the Websocket link with the Webrtc browser, such as link keeping-alive and link deletion, maintains the TCP or TLS link with the SIP stack, such as link keeping-alive and link deletion, and actively disconnects the link with the other end when the link between the Websocket converter and any end is disconnected.

Step 305: the Webrtc browser sends a Register message for registration to the Websocket converter on the established Websocket link.

Step 306: the Websocket converter performs mask decryption on the Register message born on the Websocket link, finds the TCP or TLS link corresponding to the Websocket link, and then transparently transmits the Register message to the corresponding TCP or TLS link until the SIP stack in the Webrtc2SIP gateway.

Step 307: the SIP stack analyzes the Register message to obtain second data, i.e. an analyzed Register message, and reports related information to the distribution control element through the internal interface; and the distribution control element stores the related information, queries its distribution rule, and then indicates the SIP stack to distribute the analyzed Register message to the core network of the NGN or IMS network through the internal interface, wherein the Register message has some headers, such as From, to and contact, and SIP stack is required to analyze these headers.

Step 308: the SIP stack sends the analyzed Register message to the core network of the NGN or IMS network after receiving an indication of the distribution control element.

Step 309: the NGN or IMS core network replies the SIP stack with a 200 Register message after successful registration.

Step 310: the SIP stack reports successful registration information to the distribution control element through the internal interface.

Step 311: the SIP stack forwards the 200 Register message to the Websocket converter.

Step 312: the Websocket converter finds the corresponding Websocket link, and forwards the 200 Register message to the Webrtc browser to implement registration. The Webrtc browser may initiate a conversation with an NGN or IMS terminal after successful registration. It is important to be noted that the 200 Register message is not processed by the SIP stack and the Websocket converter, so that third data and fourth data are the same.

A media plane refers to a user plane, and is configured for transmitted voice coding and decoding, Dual Tone Multi Frequency (DTMF) in-band transmission and the like, a bearer may be may be an Internet Protocol (IP) and the like, Adaptive Multi Rate (AMR), G711, GG723, G729 and the like may be adopted for coding when the IP is adopted, and RFC2833 or 4833 is adopted for DTMF in-band transmission. An Interaction between a signaling plane and the media plane may be implemented for media related control by virtue of an H248 protocol.

The media server implements intercommunication and conversion between a Webrtc media plane and an NGN or IMS media plane, and in an example embodiment, the media server converts a first media stream from the Webrtc browser into a second media stream based on a protocol supported by the NGN or IMS network, and converts the second media stream from the NGN or IMS network into the first media stream based on a protocol supported by the Webrtc browser, specifically including that:

the first media stream between the media server and the Webrtc browser is transmitted on a basis of a DTLS and SRTP, and adoption of an opus or g.711 protocol for audio coding and adoption of a VP8 or H.264 protocol for video coding are supported; and the second media stream between the media server and the NGN or IMS network is based on a Real-time Transport Protocol (RTP), and adoption of a g.711 protocol for audio coding and adoption of an H.263 or H.264 protocol for video coding are supported. DTLS ensures UDP transmission security, SRTP ensures media encryption, and they are different protocols.

The ICE server provides a media plane NAT traversal function for the Webrtc browser. In an example embodiment, before the step that the Websocket converter receives the first data from the Webrtc browser on the Websocket link, the method further includes that:

the Webrtc browser interacts with the ICE server in the gateway to acquire a public network address and port for media reception of the Webrtc browser, contains the public network address and the port in an SDP packet, and contains the SDP packet in the first data.

The embodiment of the disclosure provides a device for communication between a browser and a communication network, which includes:

a link element, configured to establish a first link with the browser, and establish a second link with an NGN or IMS network;

a first-direction conversion and sending element, configured to receive first data from the browser on the first link, convert the first data to obtain second data when the first data is call related SIP signaling, and send the second data to the NGN or IMS network on the second link; and a second-direction conversion and sending element, configured to receive third data from the NGN or IMS network on the second link, convert the third data to obtain fourth data when the third data is call related SIP signaling, and transparently transmit the fourth data to the browser on the first link.

In an example embodiment, the link element includes:

a first link component, configured to establish a Websocket link between a gateway and the browser as the first link; and a second link component, configured to establish a UDP or TCP or TLS link between the gateway and the NGN or IMS network as the second link.

The embodiment of the disclosure further provides a gateway for communication between a browser and a telecommunication network, which includes:

a Websocket converter and a SIP stack, one end of the Websocket converter is connected with the SIP stack and the other end of the Websocket converter is connected with a Webrtc browser supporting a Webrtc protocol, wherein the Websocket converter is configured to establish a Websocket link with the Webrtc browser, establish a TCP or TLS link with the SIP stack, wherein the Websocket link has a corresponding relationship with the TCP or TLS link, and send first data to the SIP stack through the TCP or TLS link when receiving the first data from the Webrtc browser on the Websocket link;

the SIP stack is configured to send the first data to a media server when the first data is call related SIP signaling and send second data to an NGN or IMS network after receiving the second data which is obtained by converting the first data by the media server and may be identified by the NGN or IMS network, and directly transparently transmit the first data to the NGN or IMS network when the first data is non-call related SIP signaling;

the SIP stack is further configured to receive call related SIP signaling from the NGN or IMS network as third data, send the third data to the media server, and send fourth data to the Websocket converter after receiving the fourth data which is obtained by converting the third data by the media server and may be identified by the Webrtc browser, or receive non-call related SIP signaling from the NGN or IMS network and send the non-call related SIP signaling to the Websocket converter as the fourth data; and the Websocket converter is further configured to receive the fourth data from the SIP stack on the TCP or TLS link, and bear the fourth data on the corresponding Websocket link for sending to the Webrtc browser.

A Webrtc2SIP gateway includes: a Websocket converter, a SIP stack, a distribution control element, a media server and an ICE server, is located between a Webrtc browser and an NGN or IMS network, implements transmission with the Webrtc browser by virtue of a Websocket link, and implements transmission with the NGN or IMS network by virtue of a UDP or TCP or TLS. For the Webrtc browser, the Webrtc2SIP gateway is a Webrtc terminal, and for the NGN or IMS network, the Webrtc2SIP gateway is a proxy of a related SIP terminal. Transmission between the NGN or IMS network and the related SIP software or hardware terminal is implemented on the basis of the UDP or TCP or TLS.

In an example embodiment, the gateway is connected with the media server; and the media server is configured to modify a Webrtc protocol related media parameter in the third data into an NGN or IMS network related media parameter to obtain the fourth data, and modify an NGN or IMS network related media parameter in the third data into a Webrtc protocol related media parameter to obtain the fourth data.

In an example embodiment, the gateway further includes:

a distribution control element, configured to receive related information sent from the SIP stack through an internal interface;

in a process of processing the first data, when the related information indicates that:

the first data is call related SIP signaling, generate a first instruction, which arrives at the SIP stack through the internal interface and indicates the SIP stack to send the first data to the media server, according to a distribution rule, and generate a second instruction, which arrives at the SIP stack through the internal interface and indicates the SIP stack to send the second data to the NGN or IMS network, according to the distribution rule;

when the first data is non-call related SIP signaling, store the related information and generate a third instruction, which arrives at the SIP stack through the internal interface and indicates the SIP stack to send the first data to the NGN or IMS network, according to the distribution rule;

in a process of processing the third data, when the related information indicates that:

the third data is call related SIP signaling, generate a fourth instruction, which arrives at the SIP stack through the internal interface and indicates the SIP stack to send the third data to the media server, according to the distribution rule, and generate a fifth instruction, which arrives at the SIP stack through the internal interface and indicates the SIP stack to send the fourth data to the Webrtc browser, according to the distribution rule; and when the non-call related SIP signaling is determined as the fourth data, generate a sixth instruction, which arrives at the SIP stack through the internal interface and indicating the SIP stack to transparently transmit the fourth data to the Webrtc browser, according to the distribution rule.

Figure 5:
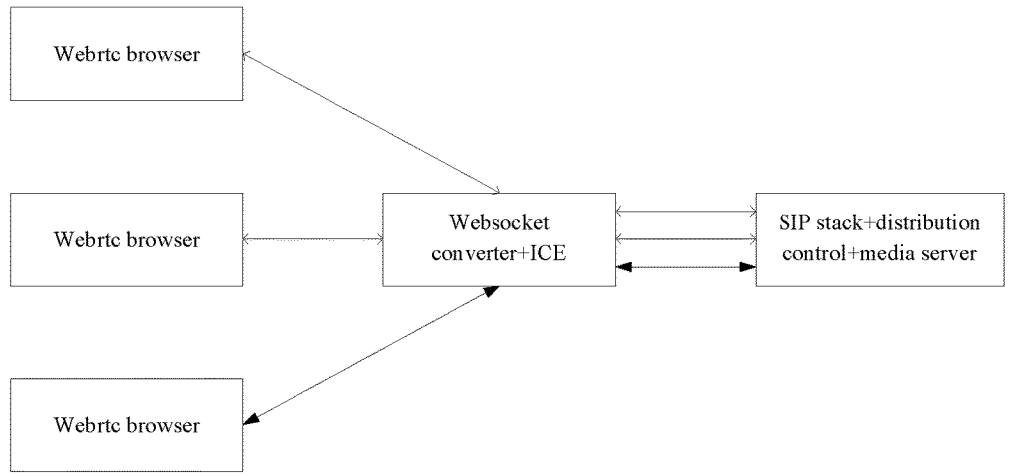
FIG. 5 is a first schematic diagram of internal networking of a Webrtc-to-SIP (Webrtc2SIP) gateway.

As shown in FIG. 5, in an example embodiment, a first functional integrated element includes a Websocket converter and an ICE server, and a second functional integrated element includes a SIP stack, a distribution control element and a media server; and the first functional integrated element is connected with the second functional integrated element. The example embodiment is applicable to a low-load condition.

Figure 6:
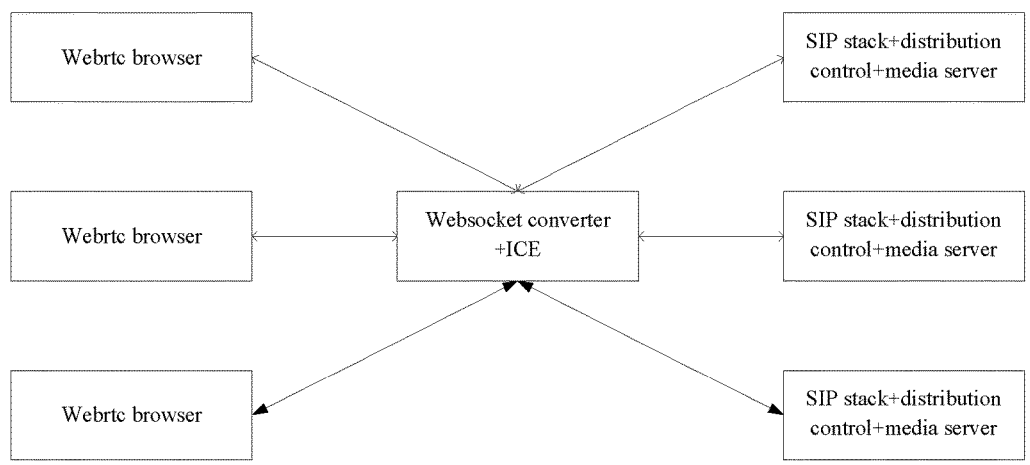
FIG. 6 is a second schematic diagram of internal networking of a Webrtc2SIP gateway.

As shown in FIG. 6, a load of the SIP stack is shared, and in an example embodiment, a first functional integrated element includes a Websocket converter and an ICE server, and a second functional integrated element includes a SIP stack, a distribution control element and a media server; and the first functional integrated element is connected with multiple second functional integrated elements. The example embodiment is applicable to distributed deployment of SIP stack+distribution control+media server.

Figure 7:
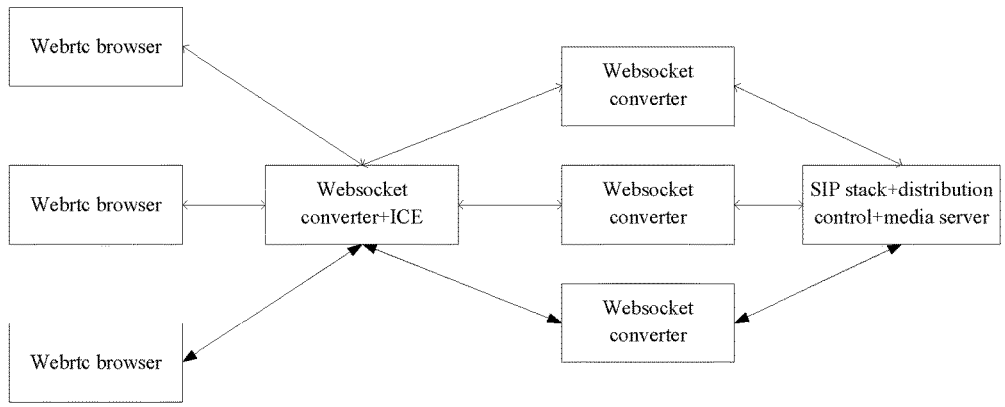
FIG. 7 is a third schematic diagram of internal networking of a Webrtc2SIP gateway.

As shown in FIG. 7, a load of the Websocket converter is shared, and in an example embodiment, a first functional integrated element includes a Websocket converter and an ICE server, and a second functional integrated element includes a SIP stack, a distribution control element and a media server; and the first functional integrated element is connected with multiple Websocket converters, and then the multiple Websocket converters are connected with the second functional integrated element. The example embodiment is applicable to distributed deployment of Websocket converter+ICE server, there being only one ICE server.

Figure 8:
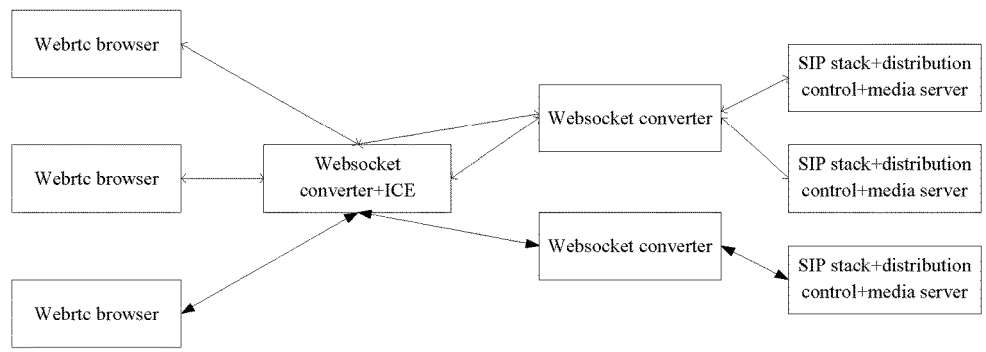
FIG. 8 is a fourth schematic diagram of internal networking of a Webrtc2SIP gateway.

As shown in FIG. 8, the loads of the SIP stack and the Websocket converter are shared, and in an example embodiment, a first functional integrated element includes a Websocket converter and an ICE server, and a second functional integrated element includes a SIP stack, a distribution control element and a media server; and the first functional integrated element is connected with multiple Websocket converters, and then each of the multiple Websocket converters is connected with one or more second functional integrated elements. The example embodiment is applicable to distributed deployment of Websocket converter+ICE server, there being only one ICE server, as well as distributed deployment of SIP stack+distribution control+media server.

According to each embodiment, each element component in the disclosure may be flexibly networked, and because each component bears a certain workload, the components may be flexibly deployed to form different network structures shown in FIG. 5 to FIG. 8 according to processing capabilities of each element component in a networking process.

In an example embodiment, the first data is message INVITE1, the second data is message INVITE2, the fourth data is message answer1 and the third data is message answer2. The Websocket converter receives message INVITE1 from the Webrtc browser on the Websocket link, an SDP contained in message INVITE1 is recorded as offer1, and offer1 includes a public network address and port for media reception.

In an example embodiment, after receiving message INVITE1, the media server modifies a media parameter related to Webrtc in offer1 into a media parameter which may be identified by the NGN or IMS network to generate new INVITE2, INVITE2 containing a modified SDP recorded as offer2, and sends INVITE2 to the SIP stack; and the media server modifies an NGN or IMS network related media parameter in answer1 into a media parameter related to Webrtc to generate a new 180 response, the 180 response containing a modified SDP recorded as answer2, and sends answer2 to the SIP stack.

Figure 4:
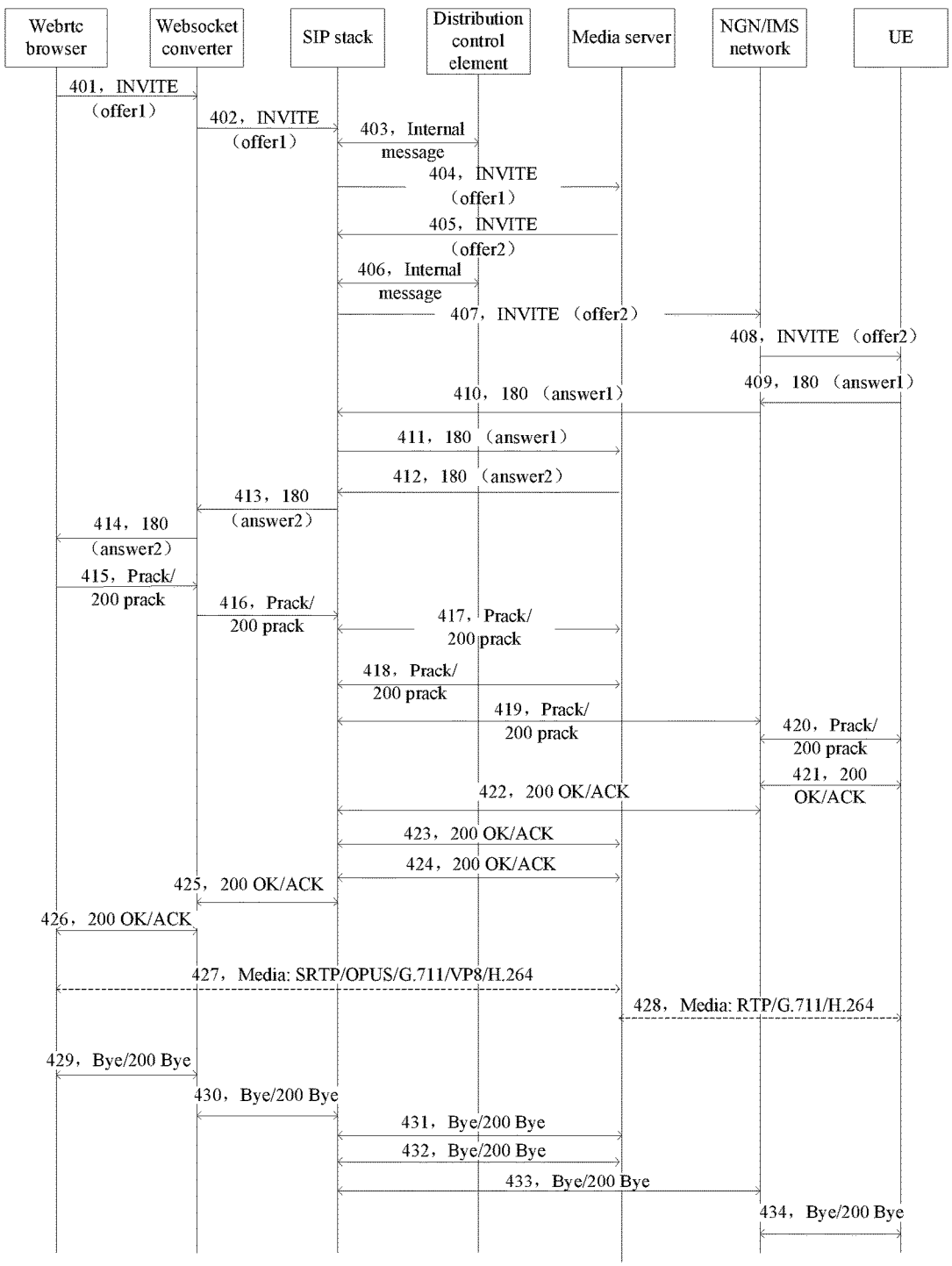
FIG. 4 is a schematic flowchart of communication between a Webrtc browser and an NGN or IMS terminal.

As shown in FIG. 4, in a flow of conversation between the Webrtc browser and UE, i.e. an NGN or IMS terminal, the Webrtc browser may interact with the ICE server in the Webrtc2SIP gateway to acquire the public network address and port for media reception before sending message INVITE1, and then contains them in the SDP. A process of conversation between the Webrtc browser and the NGN or IMS terminal includes:

Step 401: the Webrtc browser sends message INVITE1 on the Websocket link, the SDP carried in message INVITE1 being recorded as offer1;

Step 402: the Websocket converter performs mask decryption after receiving INVITE1, finds the corresponding TCP or TLS link, and forwards INVITE1 to the SIP stack in the Webrtc2SIP gateway;

Step 403: the SIP stack reports related information to the distribution control element through the internal interface after receiving and analyzing message INVITE1, and the distribution control element indicates the SIP stack to forward message INVITE1 to the media server through the internal interface after related query;

Step 404: the SIP stack forwards message INVITE1 to the media server, the carried SDP being offer1;

Step 405: the media server modifies the media parameter related to Webrtc in offer1 into the media parameter which may be identified by the NGN or IMS network, for example, modifying an audio and video coding parameter and modifying an SRTP or DTLS related parameter into an RTP parameter, to generate new INVITE2 after receiving INVITE1, the carried and modified SDP being recorded as offer2, and sends INVITE2 to the SIP stack;

Step 406: the SIP stack receives INVITE2 carrying offer2 from the media server, and reports related information to the distribution control element through the internal interface after analysis, and the distribution control element indicates the SIP stack to forward the message to the NGN or IMS network through the internal interface after related query;

Step 407: the SIP stack forwards INVITE2 carrying offer2 to the NGN or IMS network;

Step 408: the NGN or IMS network forwards INVITE2 carrying offer2 to the NGN or IMS terminal;

Step 409: the NGN or IMS terminal rings, and returns a 180 response message to the NGN or IMS network, the carried SDP being recorded as answer1;

Step 410: the NGN or IMS network forwards the 180 response message carrying answer1 to the SIP stack;

Step 411: the SIP stack forwards the 180 response message carrying answer1 to the media server;

Step 412: the media server modifies an NGN or IMS related media parameter in answer1 into a Webrtc related media parameter, for example, modifying an audio and video coding parameter and modifying an RTP related parameter into an SRTP or DTLS parameter, to generate a new 180 response, the carried and modified SDP being recorded as answer2, and sends the new 180 response to the SIP stack;

Step 413: the SIP stack sends the 180 response carrying answer2 to the Websocket converter on the TCP or TLS link;

Step 414: the Websocket converter finds the corresponding Websocket link, and forwards the 180 response carrying answer2 to the Webrtc browser;

Step 415~Step 420: the Webrtc browser and the NGN or IMS terminal implement Provisional Response ACKnowledgement (PRACK) or 200 PRACK signaling interaction;

Step 421~Step 426: the NGN or IMS terminal responds, and implements 200 INVITE or ACKnowledgement (ACK) signaling interaction with the Webrtc browser;

Step 427~Step 428: the Webrtc browser establishes a Webrtc media stream with the media server, the media server establishes an RTP media stream with the NGN or IMS terminal, the media server converts the two media streams, and at this moment, the Webrtc browser establishes communication with the NGN or IMS terminal; and Step 429~Step 434: the Webrtc browser and the NGN or IMS terminal implement communication and perform BYE or 200 BYE signaling interaction.

The embodiment of the disclosure provides a system for Webrtc, which includes a gateway for communication between a browser and a telecommunication network, the gateway including:

a Websocket converter and a SIP stack, one end of the Websocket converter is connected with the SIP stack and the other end of the Websocket converter is connected with a Webrtc browser supporting a Webrtc protocol, wherein the Websocket converter is configured to establish and maintain a Websocket link with the Webrtc browser, and establish and maintain a TCP or TLS link with the SIP stack, wherein the Websocket link has a corresponding relationship with the TCP or TLS link;

the Websocket converter is configured to send first data to the SIP stack through the TCP or TLS link when receiving the first data from the Webrtc browser on the Websocket link;

the SIP stack is configured to send the first data to a media server and send second data to an NGN or IMS network after receiving the second data which is obtained by converting the first data by the media server and may be identified by the NGN or IMS network;

the SIP stack is further configured to receive third data from the NGN or IMS network, send the third data to the media server, and send fourth data to the Websocket converter after receiving the fourth data which is obtained by converting the third data by the media server and may be identified by the Webrtc browser;

the Websocket converter is further configured to receive the fourth data from the SIP stack on the TCP or TLS link, and transparently transmit the fourth data to the Webrtc browser;

the Webrtc browser is configured to establish, maintain and delete the Websocket link with the Webrtc2SIP gateway, and generate the first data; and an NGN or IMS terminal is connected with the NGN or IMS network, and is configured to generate the third data.

The solutions have advantages as follows: the Websocket converter is located between the Webrtc browser and the SIP stack, establishes the Websocket link with the Webrtc browser as the Websocket server, and establishes the TCP or TLS link with the SIP stack as the TCP or TLS UE; according to the Websocket protocol, the data sent from the Websocket UE to the server is subjected to mask encryption operation, and the data sent from the Websocket server to the UE is not needed to be subjected to mask encryption operation; and therefore, the Websocket converter is required to perform mask decryption and then transparently transmit the SIP signaling to the SIP stack when receiving the SIP signaling sent by the Webrtc browser, and directly transparently transmits the SIP signaling to the Webrtc browser when receiving the SIP signaling sent by the SIP stack.

The above is only the example implementation mode of the disclosure, it should be pointed out that those skilled in the art may also make a plurality of improvements and embellishments without departing from the principle of the disclosure, and these improvements and embellishments shall also fall within the scope of protection of the disclosure.

INDUSTRIAL APPLICABILITY

As mentioned above, the method and gateway for communication between the browser and the telecommunication network provided by the embodiments of the disclosure have the following beneficial effects: fusion of an Internet technology and a communication technology is implemented, development of users of a telecommunication operator is implemented for the telecommunication operator, and an Internet user may enjoy services provided in the field of telecommunication.

What is claimed is:

1. A method for communication between a browser and a telecommunication network, applied to a gateway and comprising:

establishing a first link with the browser, and establishing a second link with a Next Generation Network (NGN) or Internet Protocol Multimedia Subsystem (IMS) network;

receiving call related Session Initiation Protocol (SIP) signaling from the browser on the first link, converting the call related SIP signaling to obtain first data, and sending the first data to the NGN or IMS network on the second link, receiving non-call related SIP signaling from the browser on the first link, directly transparently transmitting the non-call related SIP signaling to the NGN or IMS network;

receiving call related SIP signaling from the NGN or IMS network on the second link, converting the call related SIP signaling received from the NGN or IMS network to obtain second data and transparently transmitting the second data to the browser on the first link, and receiving non-call related SIP signaling from the NGN or IMS network on the second link, generating a first instruction, which indicates to direct transparently transmit the non-call related SIP signaling received from the NGN or IMS network to the browser, according to a distribution rule after related information of the non-call related SIP signaling received from the NGN or IMS network is analyzed.

2. The method as claimed in claim 1, wherein establishing the first link with the browser comprises:

establishing a Websocket link between the gateway and the browser as the first link.

3. The method as claimed in claim 2, wherein establishing the second link with the NGN or IMS network comprises:

establishing a User Datagram Protocol (UDP) or Transmission Control Protocol (TCP) or Transport Layer Security (TLS) link between the gateway and the NGN or IMS network as the second link.

4. The method as claimed in claim 1, wherein sending the first data to the NGN or IMS network on the link comprises:

generating a second instruction, which indicates to send the first data to the NGN or IMS network, according to a distribution rule after related information of the first data is analyzed.

5. The method as claimed in claim 1, wherein directly transparently transmitting the non-call related SIP signaling to the NGN or IMS network comprises:

generating a second instruction, which indicates to send the non-call related SIP signaling to the NGN or IMS network, according to a distribution rule after related information of the non-call related SIP signaling is analyzed.

6. The method as claimed in claim 1, wherein converting the call related SIP signaling to obtain the first data comprises:
modifying a Web Real-Time Communication (Webrtc) protocol related media parameter in a Session Description Protocol (SDP) packet of the call related SIP signaling into an NGN or IMS network related media parameter to obtain the first data.

7. The method as claimed in claim 6, wherein modifying the Webrtc protocol related media parameter in the SDP packet of the call related SIP signaling into the NGN or IMS network related media parameter to obtain the first data comprises:
converting the call related SIP signaling into the first data, wherein the call related SIP signaling is based on a Datagram Transport Layer Security (DTLS) and Secure Real-time Transport Protocol (SRTP), a first audio coding protocol and a first video coding protocol, the first data is supported by the NGN or IMS network and is based on a Real-time Transport Protocol (RTP), a second audio coding protocol and a second video coding protocol,
wherein the first audio coding protocol comprises: an opus or g.711 protocol, the first video coding protocol comprises: VP8 or H.264 protocol, the second audio coding protocol comprises: a g.711 protocol, the second video coding protocol comprises: H.263 or the H.264 protocol.

8. The method as claimed in claim 1, wherein converting the call related SIP signaling received from the NGN or IMS network to obtain the second data comprises:
modifying an NGN or IMS network related media parameter in the call related SIP signaling received from the NGN or IMS network into a Webrtc protocol related media parameter to obtain the second data.

9. The method as claimed in claim 1,
before converting the call related SIP signaling received from the NGN or IMS network to obtain the second data, further comprising:
generating a second instruction, which indicates to send the call related SIP signaling received from the NGN or IMS network to a position where data conversion is performed, according to a distribution rule after related information of the call related SIP signaling received from the NGN or IMS network is analyzed; and
after converting the call related SIP signaling received from the NGN or IMS network to obtain the second data, further comprising:
generating a third instruction, which indicates to send the second data to the browser, according to the distribution rule after related information of the second data is analyzed.

10. The method as claimed in claim 1, wherein the method further comprising:
after receiving the call related SIP signaling from the browser on the first link, performing mask decryption on the call related SIP signaling; and
after receiving the non-call related SIP signaling from the browser on the first link, performing mask decryption on the non-call related SIP signaling.

11. The method as claimed in claim 1, before receiving the call related SIP signaling or non-call related SIP signaling from the browser on the first link, further comprising:
acquiring a public network address and port for media reception of the browser, carrying the public network address and the port in an SDP packet, and carrying the SDP packet in the call related SIP signaling or non-call related SIP signaling.

12. A device for communication between a browser and a telecommunication network, comprising: a hardware processor coupled with a memory and configured to execute program instructions stored on the memory, wherein program instructions comprise instructions to:
establish a first link with the browser, and establish a second link with a Next Generation Network (NGN) or Internet Protocol Multimedia Subsystem (IMS) network;
receive call related Session Initiation Protocol (SIP) signaling from the browser on the first link, convert the call related SIP signaling to obtain first data, and send the first data to the NGN or IMS network on the second link,
receive non-call related SIP signaling from the browser on the first link, directly transparently transmit the non-call related SIP signaling to the NGN or IMS network;
receive call related SIP signaling from the NGN or IMS network on the second link, convert the call related SIP signaling received from the NGN or IMS network to obtain second data, and transparently transmit the second data to the browser on the first link; and
receive non-call related SIP signaling from the NGN or IMS network on the second link, generate a first instruction, which indicates to direct transparently transmit the non-call related SIP signaling received from the NGN or IMS network to the browser, according to a distribution rule after the related information of the non-call related SIP signaling received from the NGN or IMS network is analyzed.

13. The device as claimed in claim 12, wherein the program instructions further comprise instructions to:
establish a Websocket link between a gateway and the browser as the first link; and
establish a User Datagram Protocol (UDP) or Transmission Control Protocol (TCP) or Transport Layer Security (TLS) link between the gateway and the NGN or IMS network as the second link.

14. A gateway for communication between a browser and a telecommunication network, comprising:
a Websocket converter and a Session Initiation Protocol (SIP) stack, wherein one end of the Websocket converter is connected with the SIP stack and the other end of the Websocket converter is connected with a Web Real-Time Communication (Webrtc) browser supporting a Webrtc protocol, wherein the Websocket converter comprises a first hardware processor coupled with a first memory and configured to execute first program instructions stored on the first memory, and the SIP stack comprises a second hardware processor coupled with a second memory and configured to execute second program instructions stored on the second memory;
the first program instructions comprise instructions to:
establish a Websocket link with the Webrtc browser, establish a Transmission Control Protocol (TCP) or Transport Layer Security (TLS) link with the SIP stack, wherein the Websocket link has a corresponding relationship with the TCP or TLS link;
send call related Session Initiation Protocol (SIP) signaling to the SIP stack through the TCP or TLS link when receiving the call related SIP signaling from the Webrtc browser on the Websocket link;
and send non-call related SIP signaling to the SIP stack through the TCP or TLS link when receiving the non-call related SIP signaling from the Webrtc browser on the Websocket link;
the second program instructions comprise instructions to:
send the call related SIP signaling to a media server and send first data to a Next Generation Network (NGN) or Internet Protocol Multimedia Subsystem (IMS) network after receiving the first data which is obtained by converting the call related SIP signaling by the media server and is identified by the NGN or IMS network, and directly transparently transmit the non-call related SIP signaling to the NGN or IMS network;
receive call related SIP signaling from the NGN or IMS network, send the call related SIP signaling received from the NGN or IMS network to the media server, and send second data to the Websocket converter after receiving the second data which is obtained by converting the call related SIP signaling received from the NGN or IMS network by the media server and is identified by the Webrtc browser, or receive non-call related SIP signaling from the NGN or IMS network and send the non-call related SIP signaling received from the NGN or IMS network to the Websocket converter as the second data; and
the first program instructions further comprise instructions to:
receive the second data from the SIP stack on the TCP or TLS link, and bear the second data on the corresponding Websocket link for sending the second data to the Webrtc browser.

15. The gateway as claimed in claim 14, wherein the gateway is connected with the media server, wherein
the media server is configured to modify a Webrtc protocol related media parameter in a Session Description Protocol (SDP) packet of the call related SIP signaling into an NGN or IMS network related media parameter to obtain the first data,
and modify an NGN or IMS network related media parameter in the call related SIP signaling received from the NGN or IMS network into a Webrtc protocol related media parameter to obtain the second data.

16. The gateway as claimed in claim 14, further comprising: a distribution control element, wherein the distribution control element comprises a third hardware processor coupled with a third memory and configured to execute third program instructions stored on the third memory;
wherein the third program instructions comprise instructions to:
receive related information sent from the SIP stack through an internal interface;
in a process of processing the call related SIP signaling, generate a first instruction, which arrives at the SIP stack through the internal interface and indicates the SIP stack to send the call related SIP signaling to the media server, according to a distribution rule, wherein the related information indicates that: data received from the Webrtc browser on the Websocket link is the call related SIP signaling;
and generate a second instruction, which arrives at the SIP stack through the internal interface and indicates the SIP stack to send the first data to the NGN or IMS network, according to the distribution rule;
in a process of processing the non-call related SIP signaling, store the related information and generate a third instruction, which arrives at the SIP stack through the internal interface and indicates the SIP stack to send the non-call related SIP signaling to the NGN or IMS network, according to the distribution rule, wherein the related information indicates that: data received from the Webrtc browser on the Websocket link is the non-call related SIP signaling;
in a process of processing the call related SIP signaling received from the NGN or IMS network, generate a fourth instruction, which arrives at the SIP stack through the internal interface and indicates the SIP stack to send the call related SIP signaling received from the NGN or IMS network to the media server, according to the distribution rule, wherein the related information indicates that: data received from the NGN or IMS network is the call related SIP signaling received from the NGN or IMS network; and generate a fifth instruction, which arrives at the SIP stack through the internal interface and indicates the SIP stack to send the second data to the Webrtc browser, according to the distribution rule; and
in a process of processing the non-call related SIP signaling received from the NGN or IMS network, generate a sixth instruction, which arrives at the SIP stack through the internal interface and indicates the SIP stack to transparently transmit the non-call related SIP signaling received from the NGN or IMS network to the Webrtc browser, according to the distribution rule, wherein the related information indicates that: data received from the NGN or IMS network is the non-call related SIP signaling received from the NGN or IMS network.

17. A system for Web Real-Time Communication (Webrtc), comprising:
the gateway according to claim 14;
a browser, configured to establish, maintain and delete a Websocket link with the gateway and generate call related SIP signaling and/or non-call related SIP signaling; and
a Next Generation Network (NGN) or Internet Protocol Multimedia Subsystem (IMS) terminal, connected with an NGN or IMS network and configured to generate call related SIP signaling and/or non-call related SIP signaling.

* * * * *